United States Patent
Shin et al.

(10) Patent No.: US 11,237,979 B2
(45) Date of Patent: Feb. 1, 2022

(54) METHOD FOR MANAGEMENT OF MULTI-CORE SOLID STATE DRIVE

(71) Applicant: SAMSUNG ELECTRONICS CO., LTD., Suwon-si (KR)

(72) Inventors: Dongkun Shin, Seoul (KR); Gyuwha Han, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 93 days.

(21) Appl. No.: 16/855,094

(22) Filed: Apr. 22, 2020

(65) Prior Publication Data
US 2020/0341908 A1    Oct. 29, 2020

(30) Foreign Application Priority Data
Apr. 23, 2019   (KR) .................. 10-2019-0047476

(51) Int. Cl.
*G06F 12/00*    (2006.01)
*G06F 12/1009*  (2016.01)
(Continued)

(52) U.S. Cl.
CPC .......... *G06F 12/1009* (2013.01); *G06F 3/065* (2013.01); *G06F 3/0646* (2013.01);
(Continued)

(58) Field of Classification Search
CPC ............. G06F 12/1009; G06F 12/0253; G06F 2212/1044; G06F 2212/7201;
(Continued)

(56) References Cited

U.S. PATENT DOCUMENTS 7,469,315 B2   12/2008   Watanabe et al.
10,157,024 B2  12/2018   Kim et al.
(Continued)

FOREIGN PATENT DOCUMENTS

JP   2007-164650   6/2007
JP   2015-088069   5/2015
(Continued)

OTHER PUBLICATIONS

Yingbiao Yao et al., "An Advanced Adaptive Least Recently Used Buffer Management Algorithm for SSD", accepted Mar. 8, 2019, date of publication Mar. 12, 2019, date of current version Mar. 29, 2019, Digital Object Identifier 10.1109/ACCESS.2019.2904639.
(Continued)

*Primary Examiner* — Shawn X Gu
(74) *Attorney, Agent, or Firm* — F. Chau & Associates, LLC

(57) ABSTRACT

A method of operating a multi-core solid state drive includes: receiving an initial internal back copy command including a physical copy referencing a source Logical Page Number (LPN) and a destination LPN from a host, delaying processing of the physical copy when the physical copy requires two different flash translation layers (FTLs), and generating a modified batch internal copy command by replacing the source LPN of the physical copy with a Physical Page Number mapped to the source LPN.

20 Claims, 6 Drawing Sheets

(51) Int. Cl.
*G06F 12/02* (2006.01)
*G06F 3/06* (2006.01)

(52) U.S. Cl.
CPC .. *G06F 12/0253* (2013.01); *G06F 2212/1044* (2013.01); *G06F 2212/7201* (2013.01); *G06F 2212/7208* (2013.01)

(58) Field of Classification Search
CPC .......... G06F 2212/7208; G06F 3/0646; G06F 3/0647; G06F 3/065
See application file for complete search history.

(56) References Cited

U.S. PATENT DOCUMENTS

| | | | |
|---|---|---|---|
| 2011/0161784 A1 | 6/2011 | Selinger et al. | |
| 2014/0068216 A1 | 3/2014 | Chung | |
| 2015/0121033 A1 | 4/2015 | Higeta et al. | |
| 2015/0212751 A1* | 7/2015 | Shi | G06F 21/79 711/103 |
| 2015/0220280 A1 | 8/2015 | Ishizaki | |
| 2017/0228157 A1* | 8/2017 | Yang | G06F 13/18 |
| 2017/0242722 A1* | 8/2017 | Qiu | G06F 3/0655 |
| 2018/0081569 A1* | 3/2018 | Kan | G06F 12/121 |
| 2018/0247696 A1 | 8/2018 | Takizawa et al. | |

FOREIGN PATENT DOCUMENTS

| | | |
|---|---|---|
| JP | 2018142240 | 9/2018 |
| KR | 1020120102923 | 9/2012 |
| KR | 1020120107126 | 9/2012 |
| KR | 1020130112755 | 10/2013 |
| KR | 1020170099746 | 9/2017 |
| KR | 10-2018-0076765 | 7/2018 |
| WO | 2015114809 | 8/2015 |

OTHER PUBLICATIONS

First Office Action dated Sep. 28, 2020 in Corresponding Korean Patent Application No. KR 10-2019-0047476.

KR NOA Issued May 6, 2021 in Corresponding KR Appln. No. 10-2019-0047476.

* cited by examiner

The page list of a running transaction (a) normal block allocation (b) PC-aware block allocation w/Padding (c) PC-aware block allocation w/Padding reduction

METHOD FOR MANAGEMENT OF MULTI-CORE SOLID STATE DRIVE

CROSS-REFERENCE TO RELATED APPLICATION

This U.S. non-provisional patent application claims the benefit of priority under 35 U.S.C. § 119 to Korean Patent Application No. 10-2019-0047476, filed on Apr. 23, 2019, in the Korean Intellectual Property Office, the disclosure of which is incorporated by reference in its entirety herein.

BACKGROUND

1. Technical Field

The inventive concept relates to a method of operating a multi-core solid state drive, and more particularly, to a method of operating a multi-core solid state drive capable of ensuring atomicity of an internal copy command while reducing overhead.

2. Discussion of Related Art

A hard disk drive (HDD) is an electro-mechanical data storage device that uses magnetic storage to store and retrieve data using one or more rigid rapidly rotating platters coated with a magnetic memory. Flash memory is non-volatile memory, which uses a low amount of power, has a high performance, and high durability. A solid state drive (e.g., an SSD) based on NAND flash memory, is rapidly replacing existing hard disk drives since large capacity flash memory has become so much cheaper. The SSD is composed of a memory controller and a plurality of NAND flash chips and read/write operations may be performed on several of these chips simultaneously by utilizing a multi-channel and a multi-way structure. The memory controller may include a flash translation layer (e.g., FTL) that maps logical block addresses from a host to physical address of the flash memory.

A multi-core SSD may include two or more FTLs. However, the multi-core SSD has trouble handling internal copies between different cores. Further, it is difficult to guarantee atomicity of a batch internal copy (IC) command in the multi-core SSD since one internal copy command may be associated with two FTLs.

SUMMARY

At least one embodiment of the inventive concept provides a method of operating a multi-core SSD capable of facilitating internal copy processing between different cores.

Furthermore, at least one exemplary embodiment of the inventive concept provides a method of operating a multi-core SSD capable of ensuring atomicity of a batch internal copy command.

According to an exemplary embodiment of the inventive concept, there is provided a method of operating a multi-core solid state drive including: receiving an initial batch internal copy command including a source Logical Page Number (LPN) and a destination LPN from a host, delaying processing of the physical copy when the physical copy requires two different flash translation layers (FTLs), and generating a modified batch internal copy command by replacing the source LPN of the physical copy with a Physical Page Number (PPN) mapped to the source LPN.

According to an exemplary embodiment of the inventive concept, there is provided a method of operating a multi-core solid state driver including at least two Flash Translation Layers (FTLs). The method includes: receiving a batch internal copy command including a source Logical Page Number (LPN) associated with a first logical page and a destination LPN associated with a second logic page; sharing a same physical page with the first and second logical pages; and performing garbage collection by retrieving LPN mapping associated with the physical page.

According to an exemplary embodiment of the inventive concept, there is provided a multi-core solid state drive including a host interface controller, a first flash translation layer (FTL), and a second FTL. The host interface controller is configured to receive an initial batch internal copy command from a host. The initial batch internal copy command has a physical copy including a source Logical Page Number (LPN) and a destination LPN. The first FTL is configured to map first logical page numbers (LPNs) of the host to first physical page numbers (PPNs) of a memory device. The second FTL is configured to map second logical page numbers (LPNs) of the host to second physical page numbers (PPNs) of the NVM, the second LPNs being different from the first LPNs. The host interface controller delays processing of the physical copy and generates a modified batch internal copy command by replacing the source LPN with a physical page number (PPN) of the memory device mapped to the source LPN, when the physical copy requires the first and second FTLs.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Hereinafter, exemplary embodiments of the inventive concept will be described in detail with reference to the accompanying drawings. As used herein, the term "and/or" includes any and all combinations of one or more of the associated listed items. An expression used in the singular encompasses the expression of the plural, unless it has a clearly different meaning in context. Also, it will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Moreover, two or more components to be described below may be combined into one component that performs a single function or one component may be divided into two or more components that perform part of the function.

In addition, in performing a method of the inventive concept, each of the processes constituting the method may occur differently from the specified order unless a specific order is explicitly described in context. That is, each process may occur in the same order as specified, may be performed substantially simultaneously, or may be performed in the reverse order.

Figure 1:
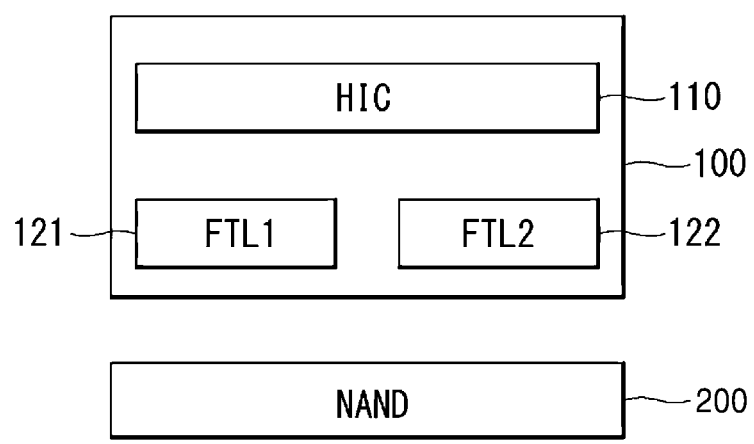
FIG. 1 is a view of a multi-core solid state driver according to an exemplary embodiment of the inventive concept.

FIG. 1 is a view of a multi-core solid state drive according to an exemplary embodiment of the inventive concept.

Referring to FIG. 1, a multi-core solid state drive according to an exemplary embodiment of the inventive concept includes a host application 100 and a memory device 200. The host application 100 includes a host interface controller 110 and first and second flash translation layers 121 and 122.

The host interface controller (hereinafter referred to as HIC) 110 controls an operation of the memory device 200 in response to a command received from a host (e.g., a host device). For example, the command could be a read command, a write command, an erase command, etc. Then, the HIC 110 determines a processing order of input/output (I/O) requests transmitted to the first and second flash translation layers (hereinafter referred to as FTLs) 121 and 122. In an exemplary embodiment the HIC 110 include a first processor that manages FTL 121 and a second processor that manages FTL 122.

Figure 3:
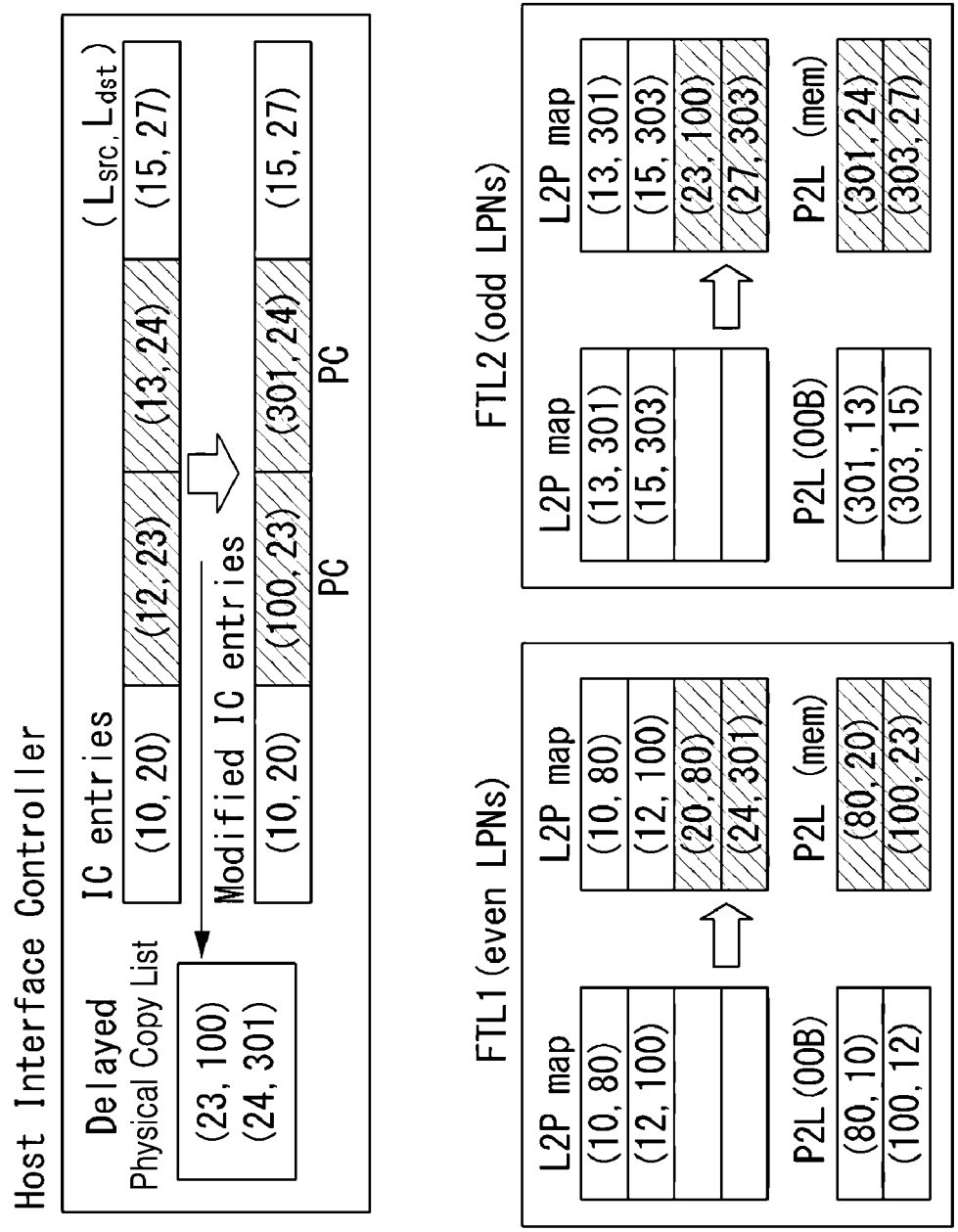
FIG. 3 is a view showing an example of processing an internal copy command according to an exemplary embodiment of the inventive concept.

The inventive concept is based on a multi-core solid state drive (SSD) in which the plurality of FTLs 121 and 122 operate on separate cores. FIGS. 1 and 3 show only the first FTL 121 and the second FTL 122, but the number of FTLs is not limited thereto. Each of the FTLs 121 and 122 translates an input logical address into a physical address. For example, the logical address may be received from a host and the physical address may correspond to a location within the memory device 200 that maps to the logical address. In an exemplary embodiment, the FTLs 121 and 122 perform a garbage collection (GC) operation to secure an effective space of an SSD. For example, the CG operation can move valid data from first memory blocks of the memory device 200 to a second memory block of the memory device and then erase the first memory blocks to free up space.

An interface according to an exemplary embodiment of the inventive concept for performing an internal copy operation based on a multi-core SSD is discussed below.

An internal copy command may be defined as ICs (src_LPN, dst_LPN). At this time, src_LPN means a source LPN, and dst_LPN means a destination LPN. LPN means a logical page number. The logical address space of the host may be divided into fixed-sized chunks, which may be referred to as pages, and each of the pages may be identified by a unique page number (e.g., a logical page number).

The internal copy command may be transmitted in a batch internal copy (IC) manner (e.g., in a batch internal copy command) to reduce overhead. Data associated with the internal copy command is copied from a source (e.g., src_LPN) to a destination (e.g., dst_LPN)).

A batch internal copy command may include metadata in addition to an array of internal copy commands. The metadata may include at least one of a group identifier (e.g., an ID) of an internal copy group, a group size, an internal copy entry count, and a hash value. The batch internal copy command may include preset digital data. The internal copy group includes a plurality of batch internal copy commands. The internal copy group is a set of internal copy entries that need to be atomically processed. The group ID defines to which internal copy group the batch internal copy command belongs. The group size means the number of internal copy commands constituting the internal copy group. The internal copy entry count means the number of internal copy commands included in the corresponding batch internal copy command. The hash value is used to determine whether normal read/write commands are input/output (I/O) associated with the batch internal copy command.

In an exemplary embodiment, the batch internal copy command is transmitted to the SSD in the same way as a normal write command. In an exemplary embodiment, a logical address range of the batch internal copy command is different from a logical address range of the normal write command to enable a memory controller or an FTL to distinguish between the batch internal copy command and the normal write command.

A processing sequence between read/write commands associated with the internal copy commands according to an exemplary embodiment of the inventive concept is discussed below.

A write operation may be performed on the memory device 200 in the same order as the write command associated with the internal copy command is input to the HIC 110.

In an exemplary embodiment, a read command associated with the internal copy command is delayed so that the read command is performed after processing the internal copy command. For example, if data is to be copied from a source location to a destination location using the internal copy command, and a read is scheduled to be performed on the data, the read can be delayed until after the internal copy command finishes copying the data from the source location to the destination location. An input/output (I/O) scheduler of the HIC 110 may use a selective-dispatch-delay (SDD) method or an all-dispatch-delay method to delay read requests and write requests. The selective-dispatch-delay method is a method of delaying only read/write requests associated with the internal copy command. For example, if data is to be copied from a source location to a destination location using the internal copy command and the data is scheduled to be updated, the update can be delayed until after the internal copy command finishes copying the data from the source location to the destination location. The all-dispatch-delay method is a method of delaying all read requests and write requests while the internal copy command is being dispatched.

The HIC 110 retrieves data of the internal copy command, and checks whether the internal copy command is associated with a normal read/write request. In an exemplary embodiment, the HIC 110 extracts a hash value stored in the metadata of the internal copy command, and checks whether the internal copy command is associated with the normal read/write request using the extracted hash value.

Figure 2:
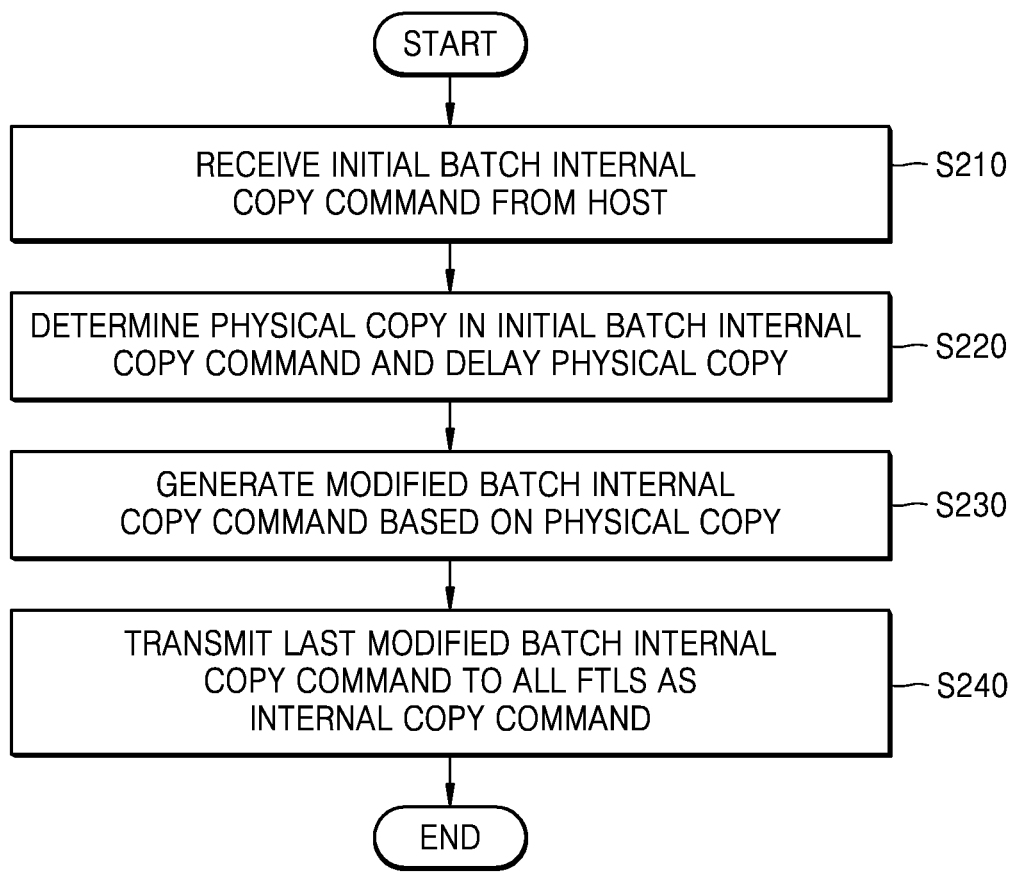
FIG. 2 is a flowchart showing an internal copy operation according to an exemplary embodiment of the inventive concept.

FIG. 2 is a flowchart showing an internal copy operation according to an exemplary embodiment of the inventive concept, and FIG. 3 is a view showing an example of processing an internal copy command of the internal copy operation.

The internal copy operation will be described with reference to FIGS. 2 and 3.

In a first operation S210, the HIC 110 receives an initial batch internal copy command from a host.

In a second operation S220, the HIC 110 determines a physical copy within the initial batch internal copy command and delays the physical copy.

The HIC 110 modifies the physical copy (hereinafter referred to as PC) processing before transmitting the internal copy command to the FTLs 121 and 122. To this end, the HIC 110 performs an operation of finding the number of physical copies in a batch internal copy (IC) request. FIG. 3 illustrates four physical copies being present in the batch IC request (e.g., (10,20), (12,23), (13, 24), and 15, 27)) as an example. When a source LPN and a destination LPN belong to the same FTL in the internal copy command, only L2P mapping is modified to perform an internal copy operation. In the internal copy command, when the source LPN and the destination LPN do not belong to the same FTL, a separate process is required because it is difficult to process the internal copy operation using only the L2P mapping. In FIG. 3, FTL1 121 handles even LPNs and FTL2 handles odd LPNs. Thus, physical copy (10,20) belongs to the same FTL1 121, physical copy (15,27) belong to the same FTL2 122, and physical copies (12,23) and (13,24) do not belong to the same FTL (e.g., see shaded entries).

For example, in the internal copy command, with respect to physical copies (12,23) and (13,24), the HIC 110 determines that the source LPN and the destination LPN of the PC do not belong to the same FTL. Since a data copy operation between the FTLs 121 and 122 needs to be performed before completion of the PC, the HIC 110 delays the PC in order to minimize processing time of the batch IC. For example, if the PC of (12,24) is scheduled to be performed at time 1 and the PC of (15, 27) is scheduled to be performed at time 2, the PC of (12,24) can be delayed to allow the PC of (15,27) to be performed at time 1.

In third operation S230, a modified batch internal copy command is generated based on the PC. For example, the PCs that belong to two different FTLs are modified.

In order to generate the modified batch internal copy command, the HIC 110 replaces a logical address of the source LPN of a PC entry with a physical page number (hereinafter referred to as PPN) received from the FTLs 121 and 122, and adds destination LPN (dst_LPN) information, and source PPN (src_PPN) information to a delayed physical copy list. For example, as shown in FIG. 3, the source logical address of 12 of the PC of (12,23) is replaced with a PPN of 100 since the LTP map of FTL1 121 maps logical address 12 to PPN 100. Further, as shown in the Host Interface Controller of FIG. 3, an entry is added to the delayed physical copy list including the destination logical address of 23 of the PC and PPN of 100. In more detail, the HIC 110 transmits a get_PPN command to the FTLs 121 and 122 for all PC entries. The get_PPN command requests a PPN where the source LPN is stored. For example, as shown in FIG. 1 and FIG. 3, the HIC 110 could provide a get_PPN command such as "get_PPN 12" to the first FTL 121 based on an internal copy entry of "(12, 23)". Then the HIC 110 could receive a response such as "PPN 100" from the first FTL 121. Which indicates that a logical address of 12 maps to a PPN of 100.

The delayed physical copy list is maintained to reorder read requests transmitted before the PC is processed by the FTL including the source LPN.

In addition, the HIC 110 adds information about the modified internal copy command to the "delayed PC list".

In a fourth operation S240, the HIC 110 transmits the modified batch internal copy command to all FTLs 121 and 122. If several modified batch internal copy commands have been generated during a given period, the HIC 110 may transmit the most recently generated or lastly generated one first.

The FTLs 121 and 122 receive the modified internal copy command and perform a copy operation by changing L2P mapping in both a logical copy (LC) and the PC.

Mapping for the FTLs 121 and 122 to process physical copies may be performed as follows.

Since a normal SSD writes physical to logical (P2L) mappings in an out of band (OOB) area, modification is not possible after the write operation.

In the multi-core SSD, two or more LPNs may be matched to one PPN in the process of performing the internal copy operation, and accordingly, multiple copy operations may occur in one PPN. Therefore, it is difficult to apply a method of writing P2L mappings in a normal OOB area in the multi-core SSD. For example, as shown in the LTP maps of FIG. 3, source logical address 12 of PC (12,23) maps to a PPN of 100 in FTL1 121 and destination logical address 23 of the PC (12,23) maps to a PPN of 100 in FTL2 122.

At least one embodiment of the inventive concept uses a changeable P2L mapping table to prevent multiple copy operations from occurring in one PPN. An exemplary embodiment of the inventive concept maintains one set of P2L mapping tables for all physical pages, that is, all NAND flash pages, and utilizes some space of a dynamic random access memory (e.g., a DRAM) as a cached mapping table (CMT) of a P2L mapping.

A normal SSD's garbage collection operation reads an OOB area of a physical page to determine which LPN the physical page is mapped to. Because the L2P mapping is a one-to-one method, the physical page is mapped to one LPN. In an exemplary embodiment, the OOB area of a physical page refers to a spare area adjacent to the physical, which may be used for error correction.

As described above, the internal copy command references the source LPN and the destination LPN. In addition, in at least one exemplary embodiment of the inventive concept, a logical page (or a logical address) of the source LPN and a logical page (or a logical address) of the destination LPN of a PC in an internal copy command share a same physical page (e.g., a PPN or physical address). A garbage collection operation according to an exemplary embodiment of the inventive concept retrieves various LPN information associated with a valid physical page. Specific embodiments of the garbage collection operation according to the inventive concept will be described below.

Figure 4:
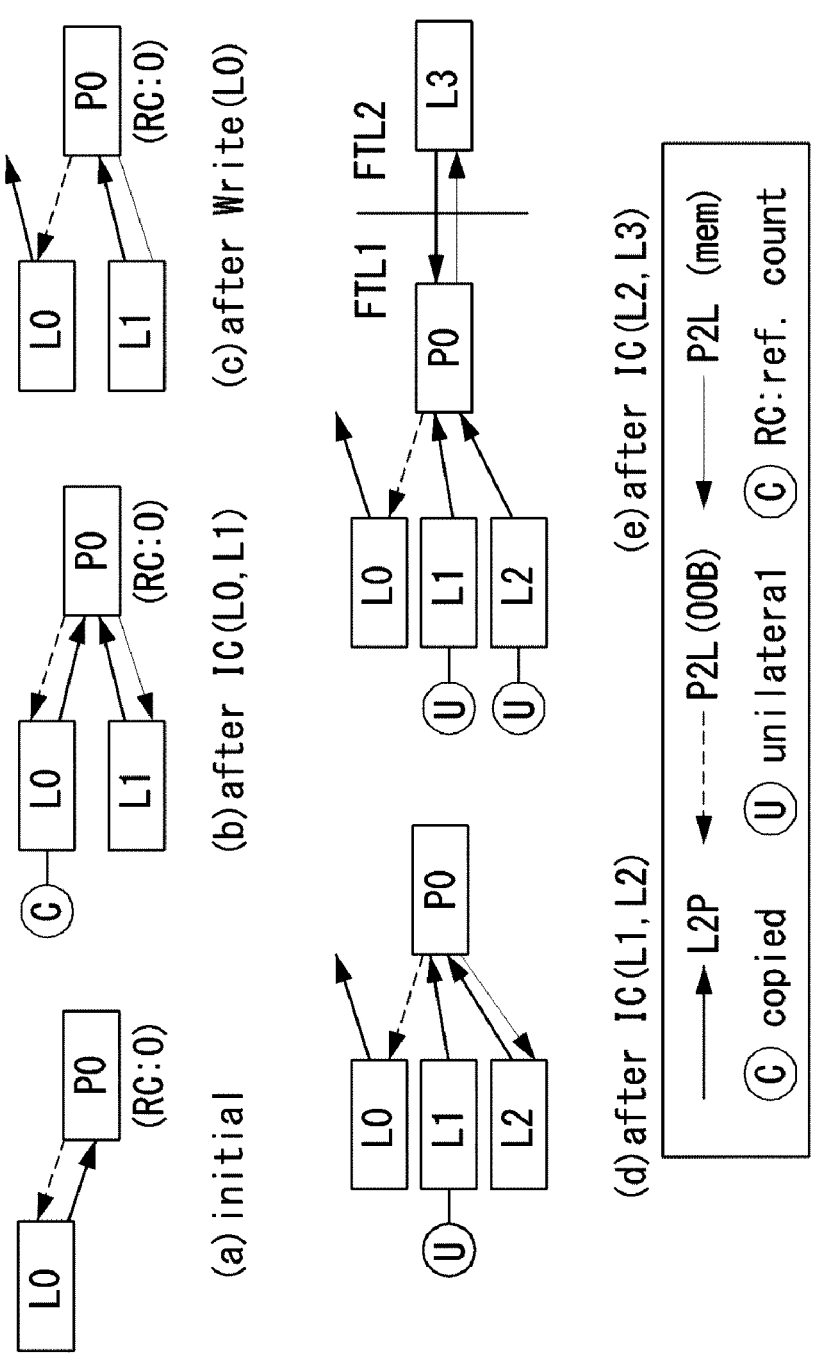
FIG. 4 is a view showing a garbage collection method according to an exemplary embodiment of the inventive concept.

FIG. 4 is a view illustrating a garbage collection operation according to an exemplary embodiment of the inventive concept.

Part (a) of FIG. 4 is a view illustrating a state in which an L2P mapping and a P2L mapping of an internal copy command are maintained in an SSD. That is, part (a) of FIG. 4 shows a state in which one PPN (e.g., L0) and one LPN (e.g., a P0) are mapped without performing an internal copy operation.

Part (b) of FIG. 4 is a view illustrating that an internal copy operation is performed in response to a request for an internal copy command IC (L0, L1) in part (a) of FIG. 4.

Referring to part (b) of FIG. 4, in order to perform the internal copy operation, an L2P mapping in which a first logical page L0 is mapped to a physical page and P2L mapping in which the physical page is mapped to a second logical page L1 are added. An L2P mapping is defined as "(L1, P0)", and a P2L mapping is defined as "(P0, L1)".

Hereinafter, the first logical page L0 will be referred to as "L0", the second logical page L1 will be referred to as "L1", and the physical page will be referred to as "P0".

According to an exemplary embodiment of the inventive concept, a garbage collection operation for a page on which the internal copy operation has been performed is discussed below.

An L2P mapping of "L0" sets a flag bit called a copied bit, and the flag bit indicates that a PPN indicating "L0" is mapped to another LPN through a P2L mapping stored in an OOB. Therefore, when an LPN is copied, the garbage collection operation may find "L0" by reading an OOB of "P0" to copy "P0". Also, since the copied bit is set in "L0", L1 may be found through a P2L mapping stored in DRAM. Through this, when the garbage collection operation moves "P0" to another location, it is possible to update an L2P mapping of all LPNs.

When an LPN is not copied, that is, an LPN in an OOB area of the physical page is mapped to the corresponding page, there is no need to access a P2L mapping table.

Part (c) of FIG. 4 shows a result of performing a write operation for "L0" in the state of part (b) of FIG. 4. In this case, "L0" indicates a new PPN through a modified L2P mapping. Since "L1" is mapped according to a P2L mapping of (P0, L0) remaining in an OOB area of "P0", the garbage collection operation recognizes that "P0" is a valid page through a valid bitmap.

Also, the garbage collection retrieves "L0" in the OOB, and checks an L2P mapping of "L0". Since an effective bitmap is set but the L2P mapping of "L0" does not indicate P0, the FTLs 121 and 122 may recognize that "L0" is not mapped to an LPN and obtain L1 through a P2L mapping of "P0" stored in DRAM. Similarly, when a garbage collection performs an operation of moving P0, it is possible to move "P0" by updating the L2P mapping of L1.

Part (d) of FIG. 4 shows a result of performing an IC (L1, L2) in the state of part (c) of FIG. 4. Referring to part (d) of FIG. 4, the IC (L1, L2) causes a one-to-many P2L mapping situation.

In the FTLs 121 and 122 according to an exemplary embodiment of the inventive concept, a P2L mapping only allows a one-to-one mapping method, and an L2P mapping only allows a one-to-many mapping method. Therefore, the P2L mapping method may match "L1" and one page of "L2" corresponding to a third logical page. In this case, "L1" refers to "P0", but there is no way to find "L1" based on "P0". Therefore, a unilateral bit is set in L1, and a block in which "L1" is set increases a reference count (ref. count), so that a NAND flash block including a PPN with the corresponding state is excluded from a garbage collection.

That is, the NAND flash block including the PPN is excluded from a victim of the garbage collection until an overwrite operation is performed on the block "L1" in which the unilateral bit is set.

Part (e) of FIG. 4 is a view showing an L2P mapping state and a P2L mapping state after performing a delayed physical copy operation in the state of part (d) of FIG.

Referring to part (e) of FIG. 4, L2 sets a unilateral bit, and P2L indicates L3. L2 increases a reference count RC by 1 because L2 is a page not found based on P0, and L3 increases the reference count RC by 1 because L3 is a page referenced by another FTL. A corresponding block is excluded from the victim of the garbage collection until an overwrite operation for L1 and L2 is performed and a delayed physical copy operation for L3 is processed.

As described above, at least one embodiment of the inventive concept may reduce overheads by delaying a physical copy operation in the process of performing an internal copy operation. However, simply delaying the physical copy operation does not simplify a NAND flash operation including a read/write operation.

In order to simplify the NAND flash operation, at least one embodiment of the inventive concept allocates a source page and a destination page to the same FTL. As such, in order to allocate the source page and the destination page to the same FTL, the embodiment of inventive concept introduces a "PC-aware file system-level block allocation" technique. For this, it is necessary to share information about how a multi-core SSD internally distributes a logical address space to the FTLs 121 and 122 and to a host.

Figure 5:
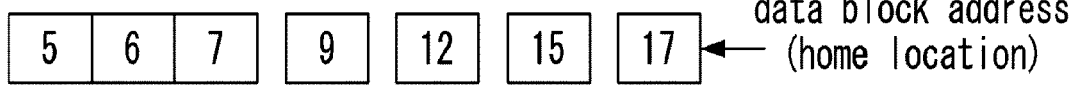
FIG. 5 is a view showing a block allocation method according to an exemplary embodiment of the inventive concept.
Figure 5:
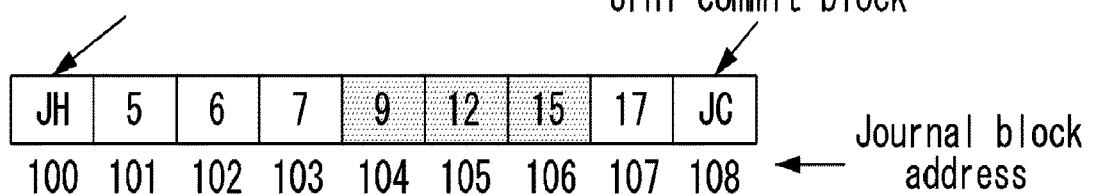
Figure 5:
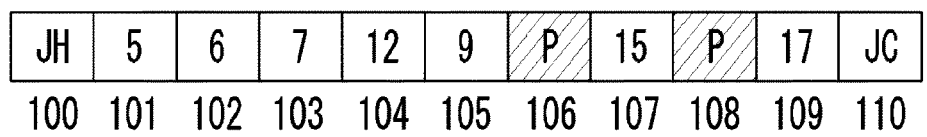
Figure 5:
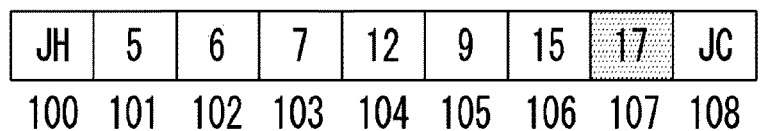
Figure 5:
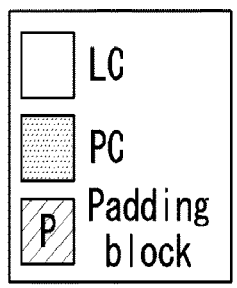

FIG. 5 is a view showing a block allocation method according to an exemplary embodiment of the inventive concept. FIG. 5 shows an embodiment of a block allocation method in a process of applying an internal copy method according to the inventive concept in an EXT4 file system.

Part (a) of FIG. 5 is a view illustrating a normal block allocation technique.

Part (b) of FIG. 5 is a view illustrating a method in which pages to be processed as physical copies are translated into logical copies LC through padding. In an exemplary embodiment, an LC refers to a source LPN and a destination LPN that belong to the same FTL (e.g., a single FTL core). This specification shows how to fully strip logical pages to each FTL core. In FIG. 5, a "home location" refers to a destination LPN that is subsequently copied through an internal copy command. For example, part (b) of FIG. 5 shows that a page with "home location" of 17 may be processed in the same FTL core by allocating to "LPN 107".

In a process of using the padding method, in an environment where there are many FTLs 121 and 122, there is a problem where the number of paddings required to remove a PC increases. Also, if space is consumed by padding, a checkpoint operation for reclaiming space may occur more frequently.

Part (c) of FIG. 5 is a view showing a block allocation method according to an exemplary embodiment of the inventive concept. The block allocation method according to the inventive concept shows a block allocation method that uses padding in a limited manner by using a PC-aware block allocation technique.

Referring to part (c) of FIG. 5, the block allocation method according to the inventive concept first translates all physical copies into LCs using padding while minimizing space. Thereafter, when the padding is used more than a threshold, the operation of returning the LC located at the end to the original position is performed. The last located LC refers to a physical copy moved by padding.

As described above, in at least one exemplary embodiment of the inventive concept, padding is not used for all physical copies, and limited padding is used to reduce overload.

An SSD needs to ensure that the order of I/O transfers from a host is the same as the order written in a NAND. A scheduling policy of the HIC 110 according to an exemplary embodiment is discussed below.

In an exemplary embodiment, an IC request has a higher priority than a write request. A processing order of write requests in the HIC 110 may be mixed. A scheduled request is transmitted to the FTLs 121 and 122. The FTLs 121 and 122 respectively have a read queue and a write queue, and preferentially process a read order. Therefore, in the FTLs 121 and 122, a read operation received late may be processed before a write operation. In an exemplary embodiment, an IC request is transmitted to the FTLs 121 and 122 as the write request. In an exemplary embodiment, entries of a queue in the FTLs 121 and 122 are processed in a first-in-first-out (FIFO) method.

At least one embodiment of the inventive concept determines a processing order between an IC request and a read request according to the following rules.

First, a read-after-copy (RAC) defines an order between an internal copy command and an associated read operation transmitted later than the corresponding internal copy command. That is, the read request is performed after an internal copy operation has completed. When an internal copy command is transmitted to the FTLs 121 and 122 but an internal copy operation associated with a read request to be newly scheduled has not been completed, the HIC 110 transmits the read request to the FTLs 121 and 122 after processing the internal copy command.

Second, a copy-after-write (CAW) has a limitation on a processing order between the internal copy command and a write request associated with the internal copy command transmitted before the internal copy command. The HIC 110 determines whether there is an associated write request that is transmitted before the internal copy command, then transmits the associated write request to the FTLs 121 and 122 first, and then transmits the internal copy command to the FTLs 121 and 122. In this process, because the FTLs 121 and 122 maintain the order in the write queue, the internal copy command may be transmitted to the FTLs 121 and 122 without waiting for processing of the write request.

According to an exemplary embodiment of the inventive concept, a method of ensuring atomicity of a batch IC request in the case of an abnormal power failure is discussed below.

The inventive concept processes an internal copy command using a weight-on-transfer (WoT) method. Each of the FTLs 121 and 122 receiving the internal copy command independently executes the internal copy command transmitted to them. When all of the internal copy commands grouped into one group are processed, the FTLs 121 and 122 mark that the internal copy of the group has ended by writing a check point (hereinafter, CP) of the internal copy group to the NAND. For example, the FTLs 121 and 122 could set one or more bits in the NAND to indicate the internal copy has ended. When a crash such as sudden-power-off (hereinafter referred to as SPO) occurs, a recoverable internal copy group may be determined through an IC group CP written in the NAND.

A recovery method according to an exemplary embodiment of the inventive concept may be performed when the SPO is detected. The recovery method is discussed below.

In the recovery method of the inventive concept, the HIC 110 mediates recovery of the FTLs 121 and 122.

Each of the FTLs 121 and 122 may have a different recoverable internal copy group. In order to ensure atomicity of the internal copy command, all FTLs 121 and 122 need to be processed for a certain internal copy group. When an SPO situation occurs, the HIC 110 collects information about the number of the last internal copy group recovered from all FTLs 121 and 122. In addition, the HIC 110 selects an internal copy group that the FTLs 121 and 122 may recover and transmits the selected internal copy group to the FTLs 121 and 122, and each of the FTLs 121 and 122 independently performs a recovery operation. For example, when the second FTL 122 is able to recover up to a fifth internal copy group, the atomicity for the fifth internal copy cannot be guaranteed because the first FTL 121 cannot perform the recovery up to the fifth internal copy group. Therefore, even though the second FTL 122 may recover up to the fifth internal copy group, the HIC 110 performs a recovery only up to a third internal copy group. Also, the FTLs 121 and 122 according to an exemplary embodiment of the inventive concept, redo and undo internal copy commands and write commands based on old-PPN information and destination LPN information.

Second, in order to guarantee the atomicity of the internal copy group, undo and redo operations need to be possible for write requests as well as the internal copy command. Here, "undo" refers to performing a corresponding write operation again, and "redo" refers to canceling the corresponding write operation. In a normal SSD, a P2L mapping entry is written in a spare area in order to perform a redo based on the SPO situation. On the other hand, in an embodiment of the inventive concept, old-ppn information is also written in a spare area corresponding to an OOB area such that an "undo" of a write operation is performed. The "old PPN information" is information necessary to perform the undo operation. The FTLs 121 and 122 write information about an old_ppn and a destination LPN (dst_lpn) in NAND flash memory after processing of each internal copy command to enable "undo" and "redo" of the internal copy command. The FTLs 121 and 122 may redo and undo the internal copy commands and the write commands using corresponding information. A redo operation of an internal copy command is performed when L2P mapping table information changed in the internal copy command after the SPO situation is reflected. An undo operation of the internal copy command is performed when the HIC 110 has more L2P mapping table information than the internal copy to be finally recovered.

Figure 6:
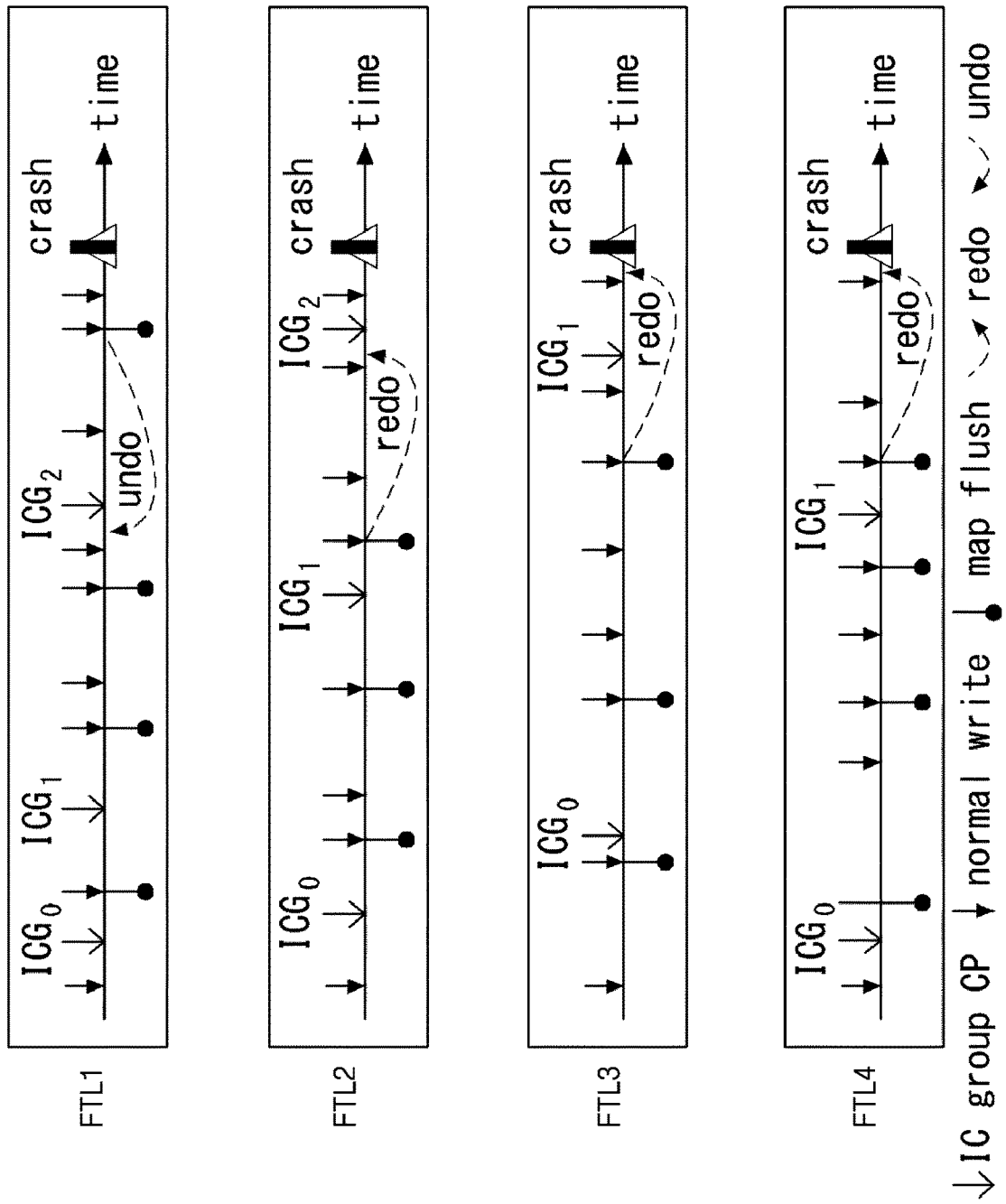
FIG. 6 is a view showing an example of a synchronized recovery process according to an exemplary embodiment of the inventive concept.

FIG. 6 is a view showing an example of a synchronized recovery process (synchronized recovery) according to an exemplary embodiment of the inventive concept described above.

Referring to FIG. 6, a first FTL FTL1 and a second FTL FTL2 may be recovered up to a second internal copy group (ICG$_2$), and a third FTL FTL3 and a fourth FTL FTL4 may be recovered up to a first internal copy group (ICG$_1$), respectively. Therefore, the HIC 110 selects a synchronized group ID as the first internal copy group (ICG$_1$). The first FTL FTL1 shows an example in which an L2P mapping is stored after processing the second internal copy group (ICG$_2$). Therefore, an "undo" is performed on the second internal copy group (ICG$_2$) and a write operation processed thereafter. The second FTL FTL2 shows an example in which a crash occurs after processing to the second internal copy group (ICG2), but the L2P mapping is stored before performing the second internal copy group (ICG$_2$). Therefore, "redo" is performed from the last stored L2P mapping to immediately before processing the second internal copy group (ICG$_2$). The third FTL FTL3 shows a state in which a crash occurs after performing the first internal copy group (ICG$_1$), and the second internal copy group (ICG$_2$) is not performed. Therefore, the third FTL FTL3 performs recovery on a write command performed before the first internal copy group (ICG$_1$) and the crash in an SPO recovery process. The fourth FTL FTL4 shows a state in which the first internal copy group (ICG$_1$) is processed before the crash occurs, and the L2P mapping is flushed after the first internal copy group (ICG$_1$) is performed. Therefore, the fourth FTL FTL4 recovers write commands performed before the crash.

In a method of operating a multi-core SSD according to an exemplary embodiment of the inventive concept, overhead may be minimized by delaying an internal copy between different cores. Furthermore, according to the method of operating the multi-core SSD of the inventive concept, even though FTLs of an SSD increase through a physical copy-aware block allocation technique, the SSD may be processed by logical copies in the FTLs. Through this, the number of write operations to NAND may be reduced to increase the life of the NAND.

In addition, scheduling using method of operating the multi-core SSD according to exemplary embodiment of the inventive concept may improve a perceived delay in an FTL, which may take a long time for internal copy commands.

Furthermore, in a method of operating the multi-core SSD according to at least one exemplary embodiment of the inventive concept, it is possible to process an internal copy command in a transactional manner by guaranteeing the atomicity of a batch IC command in the multi-core SSD. Also, an application using the internal copy command may avoid overhead to provide transactional reflection through its own log.

While the inventive concept has been particularly shown and described with reference to exemplary embodiments thereof, it will be understood that various changes in form and details may be made therein without departing from the spirit and scope of the inventive concept.

What is claimed is:

1. A method of operating a multi-core solid state drive comprising:
    receiving an initial batch internal copy command comprising a physical copy including a source Logical Page Number (LPN) and a destination LPN from a host;
    delaying processing of the physical copy when the physical copy requires two different flash translation layers (FTLs); and
    generating a modified batch internal copy command by replacing the source LPN of the physical copy with a Physical Page Number (PPN) mapped to the source LPN.

2. The method of claim 1, wherein the delaying processing of the physical copy further comprises:
    generating a delayed physical copy list including an entry for the physical copy including the destination LPN and the PPN.

3. The method of claim 2, further comprising:
    performing the physical copy processing based on a changeable Physical to Logical (P2L) mapping table and the delayed physical copy list to preventing multiple copy operations from occurring in one PPN.

4. The method of claim 1, further comprising:
    performing a copy operation through a Logical to Physical (L2P) mapping change of a logical copy and the physical copy from the modified batch internal copy command.

5. The method of claim 1, further comprising:
    transmitting the modified batch internal copy command to the FTLs.

6. The method of claim 1, further comprising:
    transforming the physical copy to a logical copy using padding; and
    recovering data of the logical copy to a location of the physical copy when a number of times the padding is used is equal to or greater than a preset threshold.

7. The method of claim 1, further comprising:
    transmitting a read request associated with the physical copy to the FTLs after an internal copy operation for the modified batch internal copy command has completed.

8. The method of claim 1, further comprising:
    transmitting the modified batch internal copy command to the FTLs after a write request received before an internal copy command of the modified batch internal copy command is transmitted to the FTLs.

9. The method of claim 1, further comprising:
    the FTLs performing a recovery operation independently upon detecting a sudden power off (SPO).

10. The method of claim 9, further comprising:
    performing a "redo" and an "undo" of an internal copy command of the modified batch internal copy command and a write command based on old-PPN information and destination LPN information, upon detecting the SPO.

11. A method of operating a multi-core solid state driver including at least two Flash Translation Layers (FTLs), the method comprising:
    receiving a batch internal copy command including a source Logical Page Number (LPN) associated with a first logical page and a destination LPN associated with a second logical page;
    sharing a same physical page with the first and second logical pages; and
    performing garbage collection by retrieving LPN mapping associated with the physical page.

12. The method of claim 11, wherein, the sharing of the same physical page is performed after setting a flag bit indicating that a physical page indicated by the first logical page is mapped to another LPN, and
    the performing of the garbage collection is performed by reading an out-of-band area of the physical page indicated by the first logical page and retrieving the first logical page.

13. The method of claim 11, wherein the sharing of the same physical page is performed after the first logical page is overwritten after performing a copy operation for the batch internal copy command, and
    the performing of the garbage collection includes determining whether the physical page is a valid page using a bitmap.

14. The method of claim 11, wherein the sharing of the same physical page includes performing an internal copy operation using the second logical page as the source LPN and a third logical page as the destination LPN.

15. The method of claim 14, wherein the performing of the garbage collection comprises:
    setting a unilateral bit in the second logical page; and
    increasing a reference count for a block in which the second logical page is set to exclude the block from the garbage collection.

16. A multi-core solid state drive comprising:
    a host interface controller configured to receive an initial batch internal copy command from a host, the initial batch internal copy command comprising a physical copy including a source Logical Page Number (LPN) and a destination LPN;
    a first flash translation layer (FTL) configured to map first logical page numbers (LPNs) of the host to first physical page numbers (PPNs) of a memory device; and
    a second FTL configured to map second logical page numbers (LPNs) of the host to second physical page numbers (PPNs) of the memory device, the second LPNs being different from the first LPNs,
    wherein the host interface controller delays processing of the physical copy and generates a modified batch internal copy command by replacing the source LPN with a physical page number (PPN) of the memory device mapped to the source LPN, when the physical copy requires the first and second FTLs.

17. The multi-core solid state drive of claim 16, wherein the host interface controller transmits the modified batch internal copy command to the FTLs after performing the replacing.

18. The multi-core solid state drive of claim 16, wherein the host interface controller transmits a command to one of the FTLs including the source LPN and the one FTL responds to the command with a PPN.

19. The multi-core solid state drive of claim 16, wherein the host interface controller maintains a list referencing a PPN and the destination LPN to reorder read requests transmitted before the physical copy is processed by one of the FTLs.

20. The multi-core solid state drive of claim 16, wherein the first LPNs are even LPNs and the second LPNs are odd LPNs.

* * * * *